(12) United States Patent
Kool et al.

(10) Patent No.: US 8,052,800 B2
(45) Date of Patent: Nov. 8, 2011

(54) METHOD FOR THE REMOVAL OF AN INSULATIVE COATING USING AN AQUEOUS SOLUTION COMPRISING DIMETHYL FORMAMIDE

(75) Inventors: Lawrence Bernard Kool, Clifton Park, NY (US); Brock Matthew Lape, Clifton Park, NY (US)

(73) Assignee: General Electric Company, Schenectady, NY (US)

( * ) Notice: Subject to any disclaimer, the term of this patent is extended or adjusted under 35 U.S.C. 154(b) by 300 days.

(21) Appl. No.: 12/327,872

(22) Filed: Dec. 4, 2008

(65) Prior Publication Data

US 2010/0144577 A1   Jun. 10, 2010

(51) Int. Cl.
*C23G 1/00* (2006.01)

(52) U.S. Cl. ............ 134/2; 134/41; 510/201; 510/202; 510/206; 510/212

(58) Field of Classification Search ................. None
See application file for complete search history.

(56) References Cited

U.S. PATENT DOCUMENTS

| | | | |
|---|---|---|---|
| 3,480,577 A * | 11/1969 | Hallstrom et al. | 523/172 |
| 3,758,577 A * | 9/1973 | Dinbergs | 564/4 |
| 3,975,208 A | 8/1976 | Tate et al. | |
| 4,045,223 A * | 8/1977 | Rubner et al. | 430/286.1 |
| 4,383,867 A | 5/1983 | Elwell, Jr. | |
| 6,250,317 B1 * | 6/2001 | Nakayama | 134/38 |
| 6,656,895 B2 | 12/2003 | Ichiki | |
| 7,226,806 B2 | 6/2007 | Sakayori et al. | |
| 7,232,514 B2 | 6/2007 | Liu et al. | |
| 2006/0122084 A1 | 6/2006 | Park et al. | |
| 2006/0138399 A1 * | 6/2006 | Itano et al. | 257/40 |

FOREIGN PATENT DOCUMENTS

DE   2425206 A1 * 12/1975

OTHER PUBLICATIONS

Taminco Inc. Dimethylformamide Technical Data Sheet, Feb. 2004, http://www.aventelfrance.com/files/Dimethylformamide/%20Technical%20Data%20Sheet.pdf.*

* cited by examiner

*Primary Examiner* — Michael Barr
*Assistant Examiner* — Caitlin N Dennis
(74) *Attorney, Agent, or Firm* — Cantor Colburn LLP

(57) ABSTRACT

A method and aqueous composition are provided for removing at least a portion of a coating from the surface of a substrate. The coating comprises an insulative material, and is contacted with an aqueous composition. The aqueous composition comprises dimethyl formamide.

16 Claims, No Drawings

METHOD FOR THE REMOVAL OF AN INSULATIVE COATING USING AN AQUEOUS SOLUTION COMPRISING DIMETHYL FORMAMIDE

FIELD OF THE INVENTION

The invention includes embodiments that relate to methods and compositions for removing a coating from a substrate. More particularly, the invention includes embodiments and compositions for removing a coating from copper components.

BACKGROUND OF THE INVENTION

Copper rods that are used in generators for electric power generation are coated with an insulation material. The insulation material must be removed during servicing of the generator. Conventional methods for removing the insulative coating are time consuming, and include the use of hazardous materials, such as paint removers. Accordingly, there is a need for methods of efficiently removing the insulative material from the copper rods that does not damage the rods. It would also be desirable if the method did not involve the use of hazardous materials.

BRIEF DESCRIPTION OF THE INVENTION

In one embodiment, a method for removing at least a portion of a coating comprising an insulative material from the surface of a substrate, comprises the step of contacting the coating with an aqueous composition which comprises dimethyl formamide.

In another embodiment, an aqueous composition comprising dimethyl formamide is provided. The aqueous composition is capable of removing at least a portion of a coating from the surface of a substrate, wherein the coating comprises an insulative material.

Other features and advantages of the present invention will be apparent from the following detailed description.

DETAILED DESCRIPTION OF THE INVENTION

Disclosed herein are methods for removing a coating from the surface of a substrate. The method includes the step of contacting the coating with an aqueous composition. As used herein, the phrase "removal of the coating" is meant to refer to the severe degradation of the coating, leaving at most only a coating residue which weakly adheres to the underlying substrate surface. The residue is easily removed by a subsequent, conventional technique such as "de-smutting", as discussed below.

In one embodiment the coating is comprised of an insulative material. The coating may comprise various insulative materials, including but are not limited to, craft paper, fish paper, commercial fiber, varnish glass cloth, and Nomex® and Conolite® insulative materials, or a combination thereof. The insulative material typically comprises a resin that adheres to the substrate. Suitable resins include, but are not limited to a polyester epoxy resin. In one embodiment, the resin is a high temperature resin having a melting point temperature of at least about 150 degrees Celsius. In another embodiment, the high temperature resin has a melting point temperature of at least about 220 degrees Celsius.

In many embodiments, the method of this invention has a very desirable degree of selectivity. In other words, the coating can be effectively removed from the substrate surface, without adversely affecting or damaging the substrate. This is an important advantage for preserving the structural integrity and dimensions of the substrate. Moreover, the treatment composition described herein is relatively benign, from an environmental standpoint, as compared to mineral acid-based compositions.

The thickness of the coating located on the substrate surface will depend on various factors, such as the type of article that is coated, the composition of the substrate, as well as the composition of the coating, etc. In one embodiment, the coating has a thickness in a range of from about 2 microns to about 2000 microns. In one embodiment, the coating has a thickness in a range from about 5 microns to about 1000 microns. In yet another embodiment, the coating has a thickness in a range from about 10 microns to about 500 microns.

The aqueous composition for this invention includes dimethyl formamide, also referred to as N,N-dimethylformamide, N-formyldimethylamine, DMF, and having the formula $HCON(CH_3)_2$. In one embodiment, the aqueous composition comprises dimethyl formamide at a concentration in a range from about 1 M to about 50 M. In another embodiment, the aqueous composition comprises dimethyl formamide at a concentration in a range from about 5 M to about 30 M. In yet another embodiment, the aqueous composition comprises dimethyl formamide at a concentration in a range from about 5 M to about 15 M.

The aqueous composition may include various other additives which serve a variety of functions. Non-limiting examples of these additives are inhibitors, dispersants, surfactants, chelating agents, wetting agents, deflocculants, stabilizers, anti-settling agents, reducing agents, and anti-foam agents. Those of ordinary skill in the art are familiar with specific types of such additives, and with effective levels for their use. An example of an inhibitor for the composition is a relatively weak acid like acetic acid.

Various techniques can be used to treat the substrate with the aqueous composition. For example, the substrate can be continuously sprayed with the composition, using various types of spray guns. A single spray gun could be employed. Alternatively, a line of guns could be used, and the substrate could pass alongside or through the line of guns or multiple lines of guns. In another alternative embodiment, the oxide-removal composition could be poured over the substrate, and continuously recirculated.

In preferred embodiments, the substrate is immersed in a bath of the aqueous composition. Immersion in this manner, in any type of vessel, often permits the greatest degree of contact between the aqueous composition and the coating material being removed. Immersion time and bath temperature will depend on various factors, some of which were described above. Additional factors include the particular type of coating material being removed, the materials being used in the bath, and equipment capabilities. Usually, the bath is maintained at a temperature in the range of about room temperature to about 100 degrees Celsius, while the substrate is immersed therein. In preferred embodiments, the temperature is maintained in the range of about 45 degrees Celsius to about 95 degrees Celsius.

The immersion time in the bath may vary considerably. It is usually in the range of about 2 minutes to about 4 hours, and preferably, from about 2 minutes to about 2 hours. Longer immersion times may compensate for lower bath temperatures.

Treatment of the substrate in the stripping bath severely degrades the integrity of the coating being removed. The degraded coating material is referred to herein as "smut" or "coating material residue". The coating material residue often continues to weakly adhere to the underlying substrate or sublayer. Consequently, the treatment is usually followed by a post-stripping step, often referred to as a "de-smutting" operation. Such a step is known in the art, and described in various references. It may be in the form of a gentle abrasion step which minimizes damage to the substrate or the underlying sublayer. As one example, grit-blasting can be carried out by directing a pressurized air stream containing aluminum oxide particles across the substrate surface. The air pressure is usually less than about 100 psi. The grit-blasting is carried out for a time period sufficient to remove the degraded coating. The duration of grit-blasting in this embodiment will depend on various factors, such as the thickness and specific composition of the smut layer; the size and type of grit media, and the like. The process is typically carried out for about 30 seconds to about 3 minutes.

Other known techniques for abrading the surface may be used in lieu of grit-blasting. For example, the substrate surface can be manually scrubbed with a fiber pad, e.g. a pad with polymeric, metallic, or ceramic fibers. Alternatively, the substrate surface can be polished, e.g., with a flexible wheel or belt in which alumina or silicon carbide particles have been embedded. Liquid abrasive materials may alternatively be used on the wheels or belts. These alternative techniques would be controlled in a manner that maintained a contact force against the substrate surface that was no greater than the force used in the grit-blasting technique discussed above.

Other techniques, or combinations of techniques, could be employed in place of abrasion, to remove the degraded coating material. Examples include tumbling of the substrate, e.g. water-tumbling, or laser ablation of its surface. Alternatively, the degraded material could be scraped off the substrate surface. As still another alternative, sound waves, e.g. ultrasonic waves, could be directed against the surface, causing vibrations which can shake loose the degraded material. For each of these alternative techniques, those skilled in the art would be familiar with operating adjustments which are made to control the relevant force applied against the surface of the substrate, as in the case of the abrasion technique, to minimize damage to the substrate or sublayer being preserved. The article is sometimes rinsed after this step, e.g., using water or a combination of water and a wetting agent.

The coating material to be removed may be located on the surface of a variety of substrates. The substrate may comprise metal, metal alloys, or a combination thereof. In one embodiment, the substrate comprises copper, iron, cobalt, nickel, aluminum, chromium, titanium, and mixtures or alloys which include any of the foregoing (e.g., stainless steel). In one embodiment, the substrate is a metallic rod or coil for use in a generator.

It should be apparent from the preceding description that another embodiment of this invention is directed to a stripping composition for removing a coating material from a substrate surface. As described herein, the substrate is often a component of a generator, e.g. a copper rod. The treatment composition includes dimethyl formamide. Various other additives can be present in the composition as described above. It is typically used in the form of bath, in which the part being treated is immersed.

All ranges disclosed herein are inclusive of the endpoints, and the endpoints are combinable with each other. The terms "first," "second," and the like as used herein do not denote any order, quantity, or importance, but rather are used to distinguish one element from another. The modifiers "about" and "approximately" used in connection with a quantity are inclusive of the stated value and have the meaning dictated by the context (e.g., includes the degree of error associated with measurement of the particular quantity). The use of the terms "a" and "an" and "the" and similar referents in the context of describing the invention (especially in the context of the following claims) are to be construed to cover both the singular and the plural, unless otherwise indicated herein or clearly contradicted by context.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

What is claimed:

1. A method for removing at least a portion of a coating comprising an insulative material from the surface of a substrate, the insulative material comprising craft paper, fish paper, commercial fiber, varnish glass cloth, or a combination thereof, and a resin, comprising the step of:
   contacting the coating with an aqueous composition which comprises dimethyl formamide.

2. The method of claim 1, wherein the aqueous composition comprises between about 1 M and about 50 M dimethyl formamide.

3. The method of claim 2, wherein the aqueous composition comprises between about 5 M and about 30 M dimethyl formamide.

4. The method of claim 1, wherein the aqueous composition comprises at least one additive selected from the group consisting of inhibitors, dispersants, surfactants, chelating agents, wetting agents, deflocculants, stabilizers, anti-settling agents, reducing agents, and anti-foam agents.

5. The method of claim 1, wherein the substrate is immersed in a bath of the aqueous composition.

6. The method of claim 5, wherein the bath is maintained at a temperature in the range of about room temperature to about 100 degrees Celsius, while the substrate is immersed therein.

7. The method of claim 5, wherein the immersion time is in a range of about 2 minutes to about 4 hours.

8. The method of claim 7, wherein the immersion time is in a range of about 2 minutes to about 2 hours.

9. The method of claim 1, wherein the substrate comprises a metal, a metal alloy, or a combination thereof.

10. The method of claim 9, wherein the substrate comprises copper, iron, cobalt, nickel, aluminum, chromium, titanium, or a combination thereof.

11. The method of claim 10, wherein the substrate comprises copper.

12. The method of claim 9, wherein the substrate is in the form of a rod.

13. The method of claim 1, wherein the coating has a thickness in a range from about 2 microns to about 2000 microns.

14. A method for removing at least a portion of a coating comprising an insulative material from the surface of a substrate, comprising the step of:
   contacting the coating with an aqueous composition which consists of water and dimethyl formamide.

15. The method of claim 14, wherein the insulative material comprises a resin.

16. A method for removing at least a portion of a coating comprising an insulative material, the insulative material comprising craft paper, fish paper, commercial fiber, varnish glass cloth, or a combination thereof, from the surface of a substrate, comprising the step of:

contacting the coating with an aqueous composition which comprises dimethyl formamide.

* * * * *